Dec. 22, 1925.
H. C. SMITH
1,566,439
DISHWASHING DEVICE
Filed June 12, 1922     2 Sheets-Sheet 1
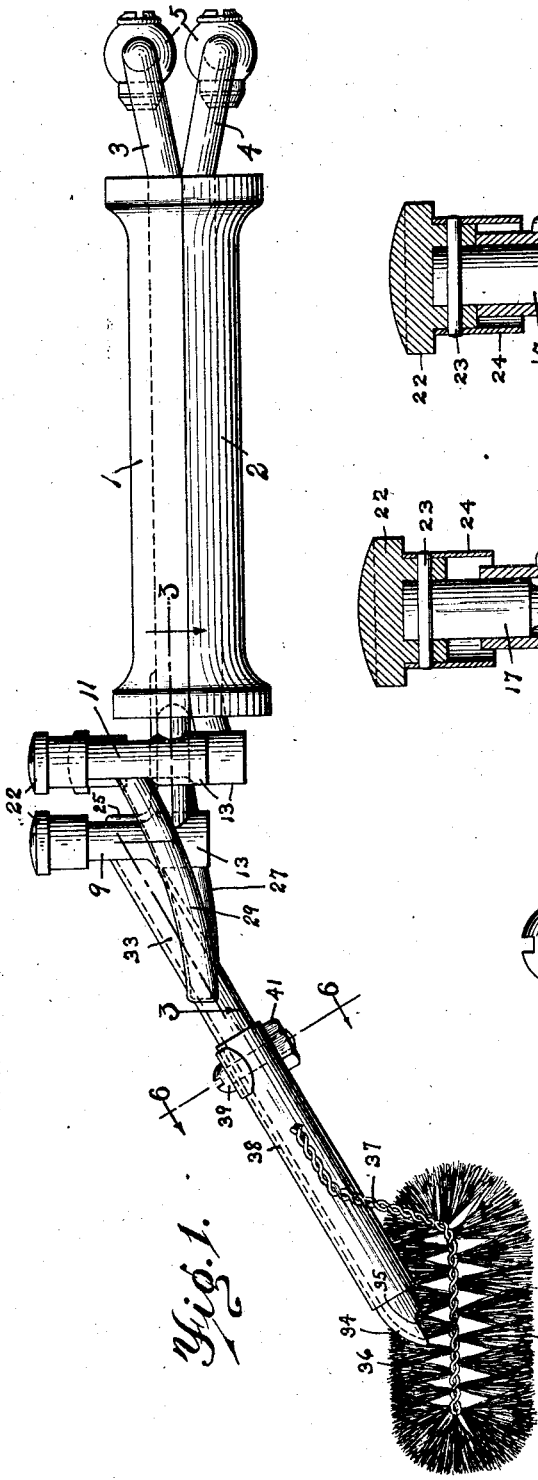
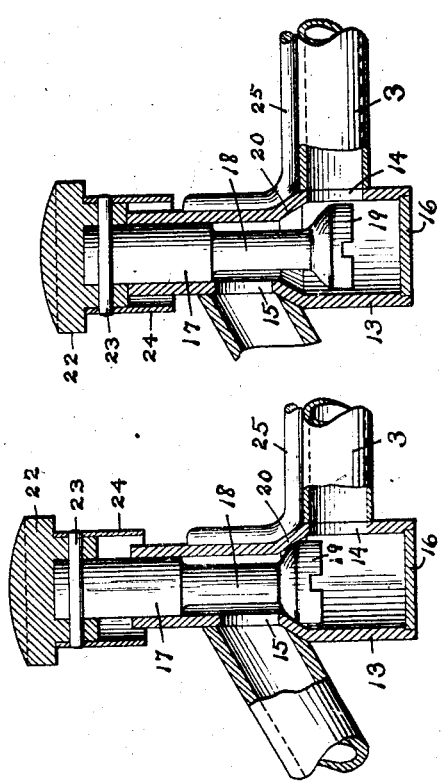
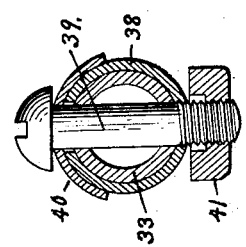
Inventor
Henry Collier Smith
By Edward N. Pagelsen
Attorney Dec. 22, 1925.
H. C. SMITH
DISHWASHING DEVICE
Filed June 12, 1922
1,566,439
2 Sheets-Sheet 2
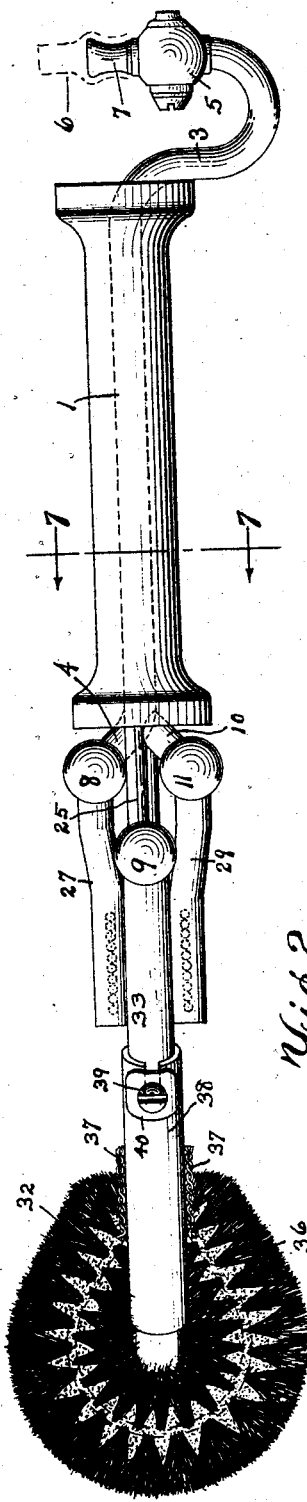
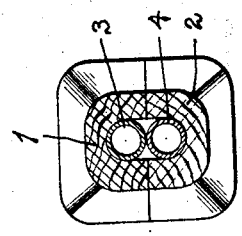
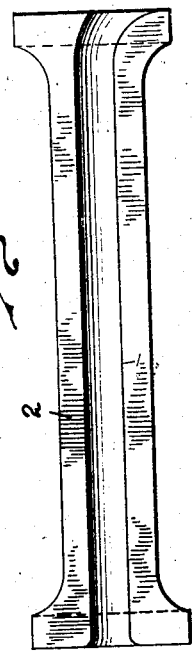
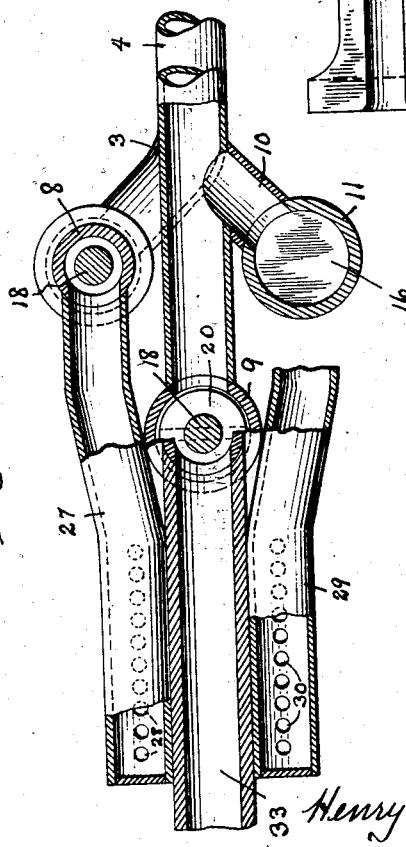
Inventor
Henry Collier Smith
By Edward N. Pagelsen
Attorney Patented Dec. 22, 1925.

1,566,439

UNITED STATES PATENT OFFICE.

HENRY COLLIER SMITH, OF ST. MARYS, OHIO.

DISHWASHING DEVICE.

Application filed June 12, 1922. Serial No. 567,506.

*To all whom it may concern:*

Be it known that I, HENRY COLLIER SMITH, a citizen of the United States, and residing at St. Marys, in the county of Auglaize and State of Ohio, have invented a new and Improved Dishwashing Device, of which the following is a specification.

This invention relates to means for removing table refuse, grease and other coatings from plates, pans and other household utensils, and its object is to provide a device which shall embody a brush and means to convey soapy water thereto. Another object is to provide means whereby sprays of either clear or soapy water, or both, may be directed against the surfaces being cleaned.

This invention consists of a brush and a support therefor embodying a handle, of a plurality of pipes to convey water to the brush and a valve to control the flow of the water, spraying devices mounted on the support, tubes connecting to the spraying devices, and valves to control the flow of water to the spraying devices.

It further consists in the details of construction illustrated in the accompanying drawings and particularly pointed out in the claims.

In the accompanying drawings, Fig. 1 is a side elevation of this improved dish washer. Fig. 2 is a plan thereof. Fig. 3 is a view, partly in plan and partly in section on the line 3—3 of Fig. 1. Figs. 4 and 5 are vertical sections showing a valve in two positions. Fig. 6 is a section on the line 6—6 of Fig. 1. Fig. 7 is a section on the line 7—7 of Fig. 2. Fig. 8 is a plan of the lower half of the handle.

Similar reference characters refer to like parts throughout the several views.

In my prior application, Serial Number 564,256, filed May 27th, 1922, I have shown a device for delivering hot clear water and hot soapy water and for regulating the temperature of this water. The present construction is adapted to be connected to the two delivery tubes of that supply apparatus or to be connected to any other supply of clear and soapy water. It is to be understood that the term "soapy water" includes water which carries any desired cleansing material.

This device is adapted to be held in one hand while the other hand manipulates the articles to be cleaned. The handle is preferably of wood or suitable composition and may be formed of two parts 1 and 2 attached to each other, each part being formed with grooves to receive one of the pipes 3 and 4. The intake ends of these pipes may be provided with control valves 5 and the supply tubes 6, preferably of rubber, slip over the nipples 7 on these valves.

The lower or clear water pipe 4 connects to the valve 8, while the upper pipe 3 connects to the valve 9 and has a branch 10 which connects to the valve 11. These valves are similar in construction, being preferably formed with a drawn tubular body 13, as shown in Figs. 4 and 5, having an intake opening 14, a discharge opening 15, a closure 16 for the lower end, a valve stem consisting of a guide portion 17 slidable in the upper end of the body, a reduced portion 18, and a valve proper 19 adapted to seat in the conical portion 20 of the body 13. The cap 22 is secured to the stem by means of a pin 23 which also holds a skirting 24 in position. The pressure of the water underneath the valve 19 normally holds it against its seat. The middle valve 9 is preferably braced by means of a rod 25 welded or soldered to the pipe 3.

Extending forward from the clear water valve 8 is a spray pipe 27 having a series of perforations 28 through which jets of rinsing water may be directed against the surfaces which have been cleaned. A similar pipe 29 extends from the soapy-water valve 11 and is provided with perforations 30 and is adapted to direct jets of soapy water against surfaces for the purpose of cleaning them, after which the surfaces are rinsed by the clear water flowing through the valve 8 and spray 28. When the surface cannot be cleaned by a spray of soapy water, it is scoured with the brush 32 and then rinsed with clear water flowing through the valve 8 and spray 28. A nozzle 33 extends from the central soapy-water valve 9 and is preferably inclined downward, as shown in Fig. 1, having a curved end 34 which extends over the discharge opening 35 so as to direct the stream of water into the middle of this brush.

The brush is preferably formed by securing bristles 36 between the wraps of a pair of wires 37 which have their ends soldered or welded to a sleeve 38 adapted to be slipped over the nozzle 33. A bolt 39 is adapted to extend through registering holes in the sleeve and nozzle and thus secures the brush to the nozzle. A curved washer 40 and nut 41 are preferably employed.

The details of construction and the proportions of the parts may all be changed by those skilled in the art without departing from the spirit of my invention as set forth in the following claims.

I claim:—

1. In a device of the class described, the combination of a plurality of supply pipes for different kinds of cleaning liquids, valves connected thereto, a spray tube connected to each valve, a third valve connected to one of said pipes, a nozzle connected to the third valve, and a brush attached to the nozzle and surrounding the discharge end thereof.

2. In a device of the class described, the combination of a plurality of supply pipes for different kinds of cleaning liquids, valves connected thereto, a spray tube connected to each valve, a third valve connected to one of the pipes, a nozzle connected to the third valve and extending beyond the aforesaid spray tubes, a sleeve detachably mounted on said nozzle, and a looped brush attached to said sleeve surrounding the discharge end of the nozzle and removable with the sleeve.

3. In a device of the class described, the combination of a plurality of supply pipes for different kinds of cleaning liquids, valves connected thereto, a spray tube connected to each valve, a third valve connected to one of the pipes, a nozzle connected to the third valve and extending beyond the aforesaid spray tubes, a sleeve detachably mounted on said nozzle, a brush attached to said sleeve surrounding the discharge end of the nozzle, a valve connected to the inlet end of each pipe to control the flow of liquid therethrough, and a handle mounted on the pipes between the valves connected thereto.

4. A device for washing dishes, pots, pans and similar articles that can be operated in one hand of the operator and comprising a pair of pipes for conducting a cleansing liquid and a rinsing liquid therethrough, means for regulating and controlling the flow of these liquids, sprays attached to the pipes, a scrubbing brush and controllable means for feeding the cleansing liquid to the brush.

H. COLLIER SMITH.